(12) United States Patent
Wang et al.

(10) Patent No.: US 9,135,940 B2
(45) Date of Patent: Sep. 15, 2015

(54) RADIO FREQUENCY CIRCUIT

(75) Inventors: Xiao-Dong Wang, Shenzhen (CN); Hang Dong, Shenzhen (CN); Ya-Nan Chen, Shenzhen (CN); Jian-Yan Feng, Shenzhen (CN)

(73) Assignees: SHENZHEN FUTAIHONG PRECISION INDUSTRY CO., LTD., Shenzhen (CN); Chi Mei Communication Systems, Inc., New Taipei (TW)

( * ) Notice: Subject to any disclaimer, the term of this patent is extended or adjusted under 35 U.S.C. 154(b) by 768 days.

(21) Appl. No.: 13/441,296

(22) Filed: Apr. 6, 2012

(65) Prior Publication Data
US 2013/0026854 A1   Jan. 31, 2013

(30) Foreign Application Priority Data

Jul. 29, 2011 (CN) .......................... 2011 1 0215773

(51) Int. Cl.
*H02G 5/06* (2006.01)
*G11B 7/24038* (2013.01)
*G11B 7/2492* (2013.01)

(52) U.S. Cl.
CPC .......... *G11B 7/24038* (2013.01); *G11B 7/2492* (2013.01)

(58) Field of Classification Search
CPC .................................. H01B 11/00; H02G 3/00

USPC ........................................ 307/147; 455/63.1
See application file for complete search history.

(56) References Cited

U.S. PATENT DOCUMENTS

| | | | | |
|---|---|---|---|---|
| 5,710,999 A * | 1/1998 | Iwase et al. | ................... | 455/349 |
| 6,531,922 B1 * | 3/2003 | Khosrowbeygi et al. | ..... | 330/288 |
| 7,724,084 B2 * | 5/2010 | Zhu et al. | ........................ | 330/66 |
| 7,800,438 B2 * | 9/2010 | Emdadi | ............................ | 330/51 |
| 8,269,554 B2 * | 9/2012 | Zhu et al. | ........................ | 330/66 |
| 2002/0097863 A1 * | 7/2002 | Rahamim et al. | ........ | 379/399.01 |
| 2007/0091915 A1 * | 4/2007 | Binder | ............................ | 370/463 |
| 2008/0180170 A1 * | 7/2008 | Zhu et al. | ....................... | 330/149 |
| 2010/0033165 A1 * | 2/2010 | Rostamzadeh et al. | ....... | 324/127 |
| 2010/0053007 A1 * | 3/2010 | Ni et al. | ......................... | 343/745 |
| 2012/0055769 A1 * | 3/2012 | Naito et al. | ................... | 200/181 |

* cited by examiner

*Primary Examiner* — Jared Fureman
*Assistant Examiner* — Alfonso Perez Borroto
(74) *Attorney, Agent, or Firm* — Novak Druce Connolly Bove + Quigg LLP

(57) ABSTRACT

A radio frequency (RF) circuit includes a first microchip for transmitting RF signal, a second microchip, two resistors and at least two signal lines. Each signal line has opposite first and second ends, and each first end of each signal line is connected to the first microchip and each second end of each signal line is connected to the second microchip. Each signal line defines first and second gaps, the first gaps are adjacent to the first microchip and the second gaps are adjacent to the second microchip. The two resistors are selectively located at the gaps of any one signal line, whereby the first microchip and the second microchip are connected to each other through the signal line and the resistors to form a connection path.

18 Claims, 1 Drawing Sheet

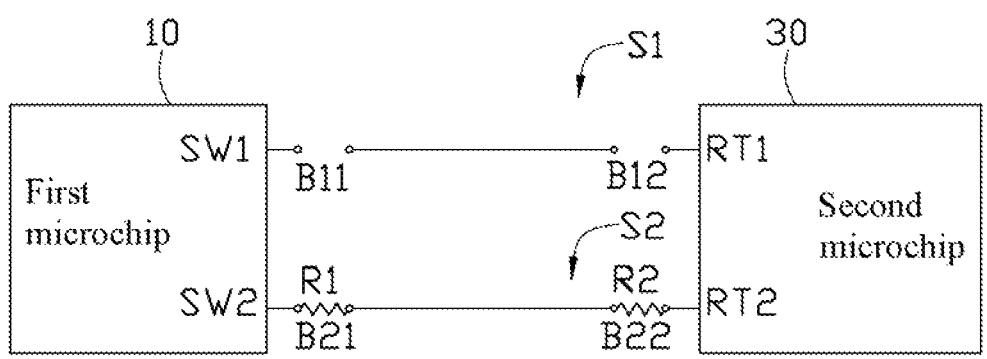

RADIO FREQUENCY CIRCUIT

BACKGROUND

1. Technical Field

The disclosure generally relates to integrated circuits, and more particularly to a radio frequency circuit used for reducing interference in signals.

2. Description of the Related Art

Radio frequency (RF) circuits are used within many mobile terminals such as mobile phones to transmit radio signals of different communication bands. The RF circuit usually includes signal lines which may be disposed and laid out close together to receive or transmit radio signals at different communication bands. However, this layout and design may easily result in signal transmission in each adjacent signal line being interfered with, thus reducing signal communication quality of the mobile terminals.

Therefore, there is room for improvement within the art.

BRIEF DESCRIPTION OF THE DRAWINGS

Many aspects of a radio frequency circuit can be better understood with reference to the drawing. The components in the drawing are not necessarily drawn to scale, the emphasis instead being placed upon clearly illustrating the principles of the radio frequency circuit.

The drawing is a circuit view of one embodiment of a radio frequency circuit of the disclosure.

DETAILED DESCRIPTION

The drawing is a circuit view of one embodiment of a radio frequency (RF) circuit 100 of the disclosure. The RF circuit 100 can be used in various types of mobile terminals, such as mobile phones, to reduce signal interference when the RF circuit 100 is transmitting and receiving RF signals of different radio communication bands.

The RF circuit 100 includes a first microchip 10, a second microchip 30, at least two signal lines, a first resistor R1, and a second resistor R2. Each signal line has opposite first and second ends, and each first end of each signal line is electrically connected to the first microchip 10, and each second end of each signal line is electrically connected to the second microchip 30. In this embodiment, the RF circuit 100 includes a first signal line S1 and a second signal line S2. The first microchip 10 can be an antenna switch, and includes a first signal transmission terminal SW1 and a second signal transmission terminal SW2. The second microchip 30 can be an RF microchip, and includes a first communication port RT1 and a second communication port RT2.

In this embodiment, when the RF signals are transmitted from the first signal transmission terminal SW1 of the first microchip 10 to the first communication port RT1 of the second microchip 30, the mobile terminal can work at one radio communication band (e.g., GSM850 MHz). When the RF signals are transmitted from the second signal transmission terminal SW2 of the first microchip 10 to the second communication port RT2 of the second microchip 30, then the mobile terminal can utilize another radio communication band (e.g., GSM900 MHz).

The opposite first and second ends of the first signal line S1 are electrically connected to the first signal transmission terminal SW1 and the first communication port RT1, respectively, to transfer RF signals. In this embodiment, the first signal line S1 defines a first gap B11 and a second gap B12 which are respectively formed near to the first microchip 10 and to the second microchip 30. Thus, the first signal line S1 is divided into three sections by the first gap B11 and the second gap B12, where the middle section is the longest of the three sections.

The first end and the opposite second ends of the second signal line S2 are electrically connected to the second signal transmission terminal SW2 and the second communication port RT2 of the second microchip 30, respectively, to transfer RF signals, and the second signal line S2 is parallel to the first signal line S1. The second signal line S2 defines a third gap B21 and a fourth gap B22, the third gap B21 is formed adjacent to the first microchip 10 and corresponds to the first gap B11. The fourth gap B22 is formed adjacent to the second microchip 30 and is aligned with the second gap B12. Thus, the second line S2 is divided into three sections by the third gap B21 and the fourth gap B22, where the middle section is the longest of three sections. In other embodiments, the distal end of each divided section can be electrically connected to a bonding pad, so that each of the first gap B11, the second gap B12, the third gap B21 and the fourth gap B22 is located between two adjacent bonding pads.

The resistors R1 and R2 are zero-ohm resistors which are wire links used to connect traces on a printed circuit board to form a connection path. In this embodiment, the resistors R1 and R2 are respectively located at the third gap B21 and the fourth gap B22 to electrically connect the three divided sections of the second signal line S2. Thus, the first microchip 10 and the second microchip 30 are electrically connected to each other through the second signal line S2 and the resistors R1 and R2. In other embodiments, the first resistor R1 and the second resistor R2 can be respectively located at the first gap B11 and the second gap B12 to electrically connect the three divided sections of the first signal line S1.

When the first resistor R1 and the second resistor R2 are respectively located at the first gap B11 and the second gap B12 to electrically connect the three divided sections of the first signal line S1, the first microchip 10 and the second microchip 30 are then electrically connected to each other through the first signal line S1 and the first resistors R1 and the second resistor R2, forming a connection path between the first microchip 10 and the second microchip 30. Thus, the mobile terminal can be applied to the radio communication band (e.g., GSM850 MHz) without other signal interference. Further, since the second signal line S2 is divided into three sections by the third gap B21 and the fourth gap B22, the RF signal cannot be transmitted through the second signal line S2. Thus, the second signal line S2 cannot be a source of interference in relation to the first signal line S1.

Similarly, when the resistors R1 and R2 are respectively located at the third gap B21 and the fourth gap B22 to electrically connect the three divided sections of the second signal line S2, the first microchip 10 and the second microchip 30 are electrically interconnected through the second signal line S2 and the resistors R1 and R2 and form a connection path. Thus, the mobile terminal works at the radio communication band (e.g., GSM900 MHz) without other signal interference, and the first signal line S1 is divided into three sections by the first gap B11 and the second gap B12, and cannot produce interference within the second signal line S2.

In addition, the number of the signal lines can be, but is not limited to, three or four, for example, corresponding to different radio communication bands.

In summary, in the RF circuit 100 of the present disclosure, the signal lines S1 and S2 can transmit different radio signals of different communication bands, and each signal line has gaps defined near to the microchips. Thus, when any signal line with a zero-ohm resistor forms a connection path between the first microchip 10 and the second microchip 30 to transmit radio signals, it is not interfered with any other signal line. The RF circuit 100 is not only designed to be simple, but also can also achieve effectively zero mutual signal interference.

In the present specification and claims, the word "a" or "an" preceding an element does not exclude the presence of a plurality of such elements. Further, the word "comprising" does not exclude the presence of elements or steps other than those listed.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in the matters of shape, size, and arrangement of parts within the principles of this exemplary disclosure to the full extent indicated by the broad general meaning of the terms in which the appended claims are expressed.

What is claimed is:

1. A radio frequency (RF) circuit comprising:
   a first microchip for receiving and transmitting RF signal;
   a second microchip for receiving and transmitting RF signal;
   two resistors; and
   at least two signal lines, wherein each signal line has opposite first and second ends and each first end of each signal line is electrically connected to the first microchip and each second end of each signal line is electrically connected to the second microchip, each signal line defines first and second gaps, the first gaps adjacent to the first microchip and the second gaps adjacent to the second microchip, and the two resistors are selectively located at the first and second gaps of any one signal line, whereby the first microchip and the second microchip are electrically connected to each other through the signal line and the resistors to form a connection path.

2. The RF circuit as claimed in claim 1, wherein:
   the first microchip comprises a first signal transmission terminal and a second signal transmission terminal;
   the second microchip comprises a first communication port and a second communication port; and
   when the RF signals are transmitted from the first signal transmission terminal of the first microchip to the first communication port of the second microchip, the RF circuit sends the RF signal of one type of communication band without interference of other RF signals.

3. The RF circuit as claimed in claim 2, wherein when the RF signals are transmitted from the second signal transmission terminal of the first microchip to the second communication port of the second microchip, the RF circuit is applied to another type of communication band without interference of other RF signals.

4. The RF circuit as claimed in claim 2, wherein the RF circuit comprises a first signal line, the opposite first and second ends of the first signal line are electrically connected to the first signal transmission terminal and the first communication port to transfer RF signals, and the first gap and the second gap of the first signal line are respectively formed near to the first microchip and the second microchip.

5. The RF circuit as claimed in claim 4, wherein the first signal line is divided into three sections by the first gap and the second gap, where the middle section is the longest of the three sections.

6. The RF circuit as claimed in claim 4, wherein the RF circuit comprises a second signal line, the opposite first and second ends of the second signal line are electrically connected to the second signal transmission terminal and the second communication port of the second microchip to transfer RF signals, and the second signal line is parallel to the first signal line.

7. The RF circuit as claimed in claim 6, wherein the second signal line defines a third gap and a fourth gap, the third gap corresponding to the first gap is formed adjacent to the first microchip, the fourth gap is formed adjacent to the second microchip and is aligned with the second gap, and the second line is divided into three sections by the third gap and the fourth gap, where the middle section is the longest of the three sections.

8. The RF circuit as claimed in claim 7, wherein the resistors are zero-ohm resistors which are wire links used to form a connection path, the resistors can be respectively located at the first gap and the second gap of the first signal line or located to the third gap and the fourth gap of the second signal line and form two connection paths to transmit RF signals of different radio communication bands.

9. The RF circuit as claimed in claim 1, wherein the first microchip is an antenna switch, and the second microchip is an RF microchip.

10. A radio frequency (RF) circuit applied to reduce signal interference, the RF circuit comprising:
    a first microchip for transmitting RF signal;
    a second microchip for receiving and transmitting RF signal;
    a first signal line, having opposite first and second;
    a second signal line, each of the first signal line and the second signal line having opposite first and second ends, and each first end of each of the first signal line and the second signal electrically connected to the first microchip, and each second end of each of the first signal line and the second signal electrically connected to the second microchip; and
    two resistors, wherein each of the first signal line and the second defines first and second gaps, the first gaps adjacent to the first microchip and the second gaps adjacent to the second microchip, when the two resistors are located at the first and second gaps of the first signal line, the first microchip and the second microchip are electrically connected through the first signal line and the resistors and form a connection path to transfer one type of RF signal; when the two resistors are located at the first and second gaps of the second signal line, the first microchip and the second microchip is electrically connected via the second signal line and the resistors and form another connection path to transfer another type of RF signal.

11. The RF circuit as claimed in claim 10, wherein:
    the first microchip comprises a first signal transmission terminal and a second signal transmission terminal;
    the second microchip comprises a first communication port and a second communication port; and
    when the RF signals are transmitted from the first signal transmission terminal of the first microchip to the first communication port of the second microchip, the RF circuit is applied to the radio communication band of GSM850 MHz.

12. The RF circuit as claimed in claim 11, wherein when the RF signals are transmitted from the second signal transmission terminal of the first microchip to the second communication port of the second microchip, the RF circuit is applied to the radio communication band of GSM900 MHz.

13. The RF circuit as claimed in claim 11, wherein the opposite first and second ends of the first signal line are electrically connected to the first signal transmission terminal of the first microchip and the first communication port of the second microchip to transfer RF signals, and the first gap and the second gap of the first signal line are respectively formed near to the first microchip and the second microchip.

14. The RF circuit as claimed in claim 13, wherein the first signal line is divided into three sections by the first gap and the second gap, where the middle section is the longest of the three sections.

15. The RF circuit as claimed in claim 13, wherein the opposite first and second ends of the second signal line are electrically connected to the second signal transmission terminal of the first microchip and the second communication port of the second microchip to transfer RF signals, and the second signal line is parallel to the first signal line.

16. The RF circuit as claimed in claim 15, wherein the second signal line defines a third gap and a fourth gap, the third gap corresponding to the first gap is formed adjacent to the first microchip, the fourth gap is formed adjacent to the second microchip and is aligned with the second gap, and the second line is divided into three sections by the third gap and the fourth gap, where the middle section is the longest of the three sections.

17. The RF circuit as claimed in claim 16, wherein the resistors are zero-ohm resistors which are wire links used to form a connection path, the resistors can be respectively located at the first gap and the second gap of the first signal line or located to the third gap and the fourth gap of the second signal line and form two connection paths to transmit RF signals of different radio communication bands.

18. The RF circuit as claimed in claim 10, wherein the first microchip is an antenna switch, and the second microchip is an RF microchip.

* * * * *